Patented May 1, 1923.

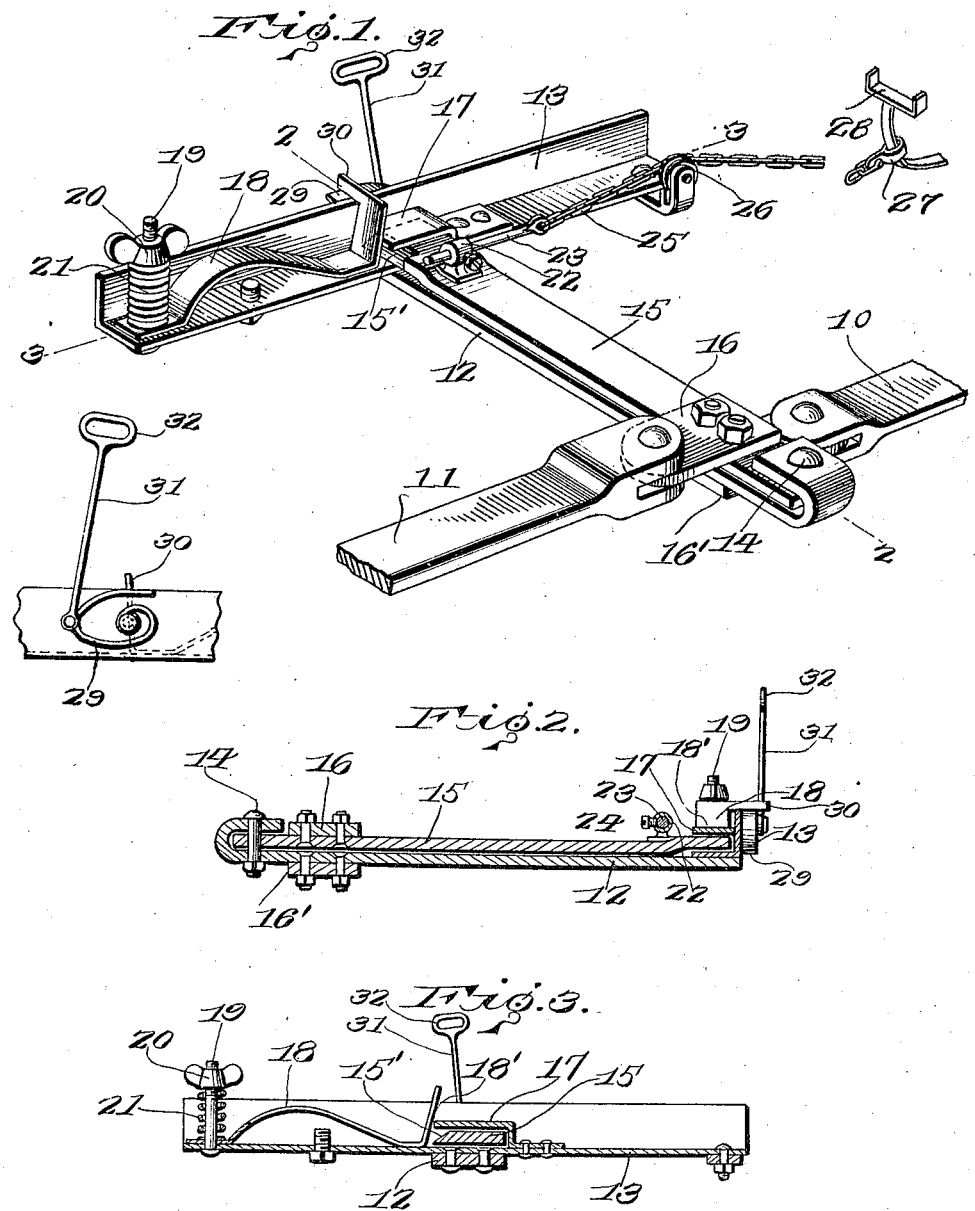

1,453,383

UNITED STATES PATENT OFFICE.

FRED P. DEDERING, OF KIEL, WISCONSIN.

TRACTOR HITCH.

Application filed January 14, 1922. Serial No. 529,262.

*To all whom it may concern:*

Be it known that I, FRED P. DEDERING, a citizen of the United States, residing at Kiel, in the county of Manitowoc, State of Wisconsin, have invented certain new and useful Improvements in Tractor Hitches; and I do hereby declare the following to be a full, clear, and exact description of the invention, such as will enable others skilled in the art to which it appertains to make and use the same.

This invention relates to new and useful improvements in hitches and particularly to hitches for use in connection with tractors and agricultural implements.

One object of the invention is to provide a hitch by means of which the clutch of the tractor will be automatically thrown out when an excessively hard pull rearwardly is exerted by the implement, as when striking an obstruction, such as a stone or stump.

Another object of the invention is to provide a device of this character wherein the detent for the movable element of the hitch may be regulated to operate only upon a pull being exerted greater than a predetermined one.

Other objects and advantages will be apparent from the following description when taken in connection with the accompanying drawings.

In the drawings:

Figure 1 is a perspective view of the hitching device, in connection with the beam of an agricultural implement and with the draw bar of a tractor.

Figure 2 is a vertical longitudinal central sectional view through the main beam and the movable beam, on the line 2—2 of Figure 1.

Figure 3 is a vertical longitudinal central section through the angle bar of the main beam, on the line 3—3 of Figure 1.

Referring particularly to the accompanying drawings, 10 represents a portion of the draw bar of a tractor, and 11 a portion of the draw bar for attachment to an implement to be drawn, and in connection with which the invention is adapted for use.

Extending at right angles to, and having one end disposed between the ends of the bars 10 and 11, is a bar or main beam 12, the said end being bent or doubled to overlie the adjacent portion of the body of the beam. Secured to, and extending transversely of the other end of the beam 12, is an angle bar 13, the horizontal wing of which is secured to the beam. Mounted on a vertical pivot 14, which passes through the doubled portion of the beam, is one end of a bar 15, the same extending longitudinally over the beam 12, with its outer end arranged for sliding movement on the horizontal wing of the angle bar 13. Secured to the bar 15, adjacent the doubled portion of the beam 12, is a rearwardly extending and apertured plate 16, the draw bar 11 of the agricultural machine being pivotally connected to this plate.

Secured to the lower face of the bar 12, below the point of attachment of the plate 16, is a similar plate 16', which extends in a direction opposite to that of the said plate 16, and has pivotally connected thereto, the draw bar 10.

Secured to the horizontal wing of the angle bar 13, and being offset upwardly and rearwardly therefrom, is a keeper plate 17 beneath which the outer end of the bar 15 is arranged to lie under normal conditions. Extending longitudinally on the said wing of the angle bar 13, and extending forwardly in the direction of the outer end of the bar 15, is a leaf spring 18, the free end of which is turned upwardly, as at 18', to lie against the adjacent side edge of the outer end of the bar 15. This edge portion of the bar 15 is beveled, as shown at 15', for easy passage beneath the adjacent end of the spring 18. Disposed vertically through the intermediate portion of the spring 18, and through the horizontal wing of the angle bar 13, is a bolt 19, the head of the bolt engaging against the lower face of the said wing, while the upper end carries a winged nut 20, arranged above the spring. On the bolt 19, between the nut 20, and the upper face of the spring 18, is a coil spring 21, which adds its tension to that of the spring 18, to maintain the forward end of the spring 18, in firm contact with the upper face of the wing of the member 13, so that under normal pulling strains the beveled edge of the bar 15 will be prevented from passing beneath the spring 18. Under excessive strains, such as are incident to the plows striking a stone or stump, the bar 15 will pass beneath the end of the spring 18.

Carried by the outer end of the bar 15, and extending vertically therefrom, is an eye member 22, through which passes a rod 23, a set screw 24 being engaged in the eye member for biting engagement with the rod to permit longitudinal adjustment of the rod through the eye. Connected to the forward end of the rod 23 is a forwardly extending chain 25, the same passing over a grooved pulley 26, mounted on the forward end of the angle bar 13, from whence it extends to and is connected with the collar 27 which encircles the clutch pedal 28 of the tractor.

Thus, when the bar 15 is swung rearwardly, under an excessive strain, the chain 25 will be pulled and the clutch pedal rocked to throw out the clutch of the tractor, with the result that the tractor and plow will be brought to a stand still, and breakage of any part of the mechanism prevented. To continue forwardly with the tractor and plow, it is necessary to swing the bar 15 forwardly so that its outer end will be released from beneath the spring 18, and be permitted to resume its normal position beneath the keeper plate 17. This is accomplished by means of the releasing device which consists of the flat coiled spring 29 which is mounted on the vertical wing of the angle bar 13, and has its free end disposed under the lateral finger 30 formed on the free end of spring 18, said finger extending across the upper edge of said wing. Pivotally connected to the spring 29, adjacent its free end, is a vertical rod 31, the same having a handhold 32 on its upper end. The spring 29 is of such construction that it acts as a cam, so that when the rod 31 is pulled upwardly the spring will engage the finger 30 and lift the spring 29, so that the bar 15 will be permitted to pass forwardly from thereunder. The spring 29 remains in this position to hold up the spring 18, until released by a downward push on the rod 31. When the bar 15 has been released, the operator can restore the pedal 28 to its normal position by a lifting movement with his foot.

What is claimed is:

1. A hitching device for a tractor including a beam, a bar movably mounted on the beam, a means on the beam and normally contracted by the movable bar for holding the bar against movement under normal pulling strains but releasable by said bar under excessive strains, and means connected with the movable bar and with the clutch pedal of the tractor for moving the pedal to throw out the clutch.

2. A hitching device for a tractor, including a beam for connection with the tractor, a bar pivotally carried by the beam for connection with an agricultural implement or object to be pulled, a transverse member carried by the outer end of the bar, a detent on the transverse member for holding the pivoted bar from movement under normal pulling strains, and means operable by the pivoted bar for throwing out the clutch of the tractor.

3. A hitching device for a tractor including a beam, a bar pivotally supported at one end on one end of the beam and extending longitudinally thereof, a transverse member mounted on the outer end of the beam, a spring detent mounted on the transverse member for holding the bar against movement under normal pulling strains, a keeper for the end of the bar mounted on the transverse member, a rotatable guide on the transverse member, and a flexible element connected to the bar and to the clutch pedal of the tractor.

In testimony whereof, I affix my signature, in the presence of two witnesses.

FRED P. DEDERING.

Witnesses:
 ALBERT WAGENKNECHT,
 HELENA DEDERING.